US005778375A

United States Patent [19]

Hecht

[11] Patent Number: 5,778,375

[45] Date of Patent: Jul. 7, 1998

[54] DATABASE NORMALIZING SYSTEM

[75] Inventor: Stephen C. Hecht, Seattle, Wash.

[73] Assignee: Microsoft Corporation, Redmond, Wash.

[21] Appl. No.: 673,818

[22] Filed: Jun. 27, 1996

[51] Int. Cl.[6] .......... G06F 17/30

[52] U.S. Cl. .......... 707/101; 707/100; 707/102

[58] Field of Search .......... 707/100, 101, 707/1, 102, 2

[56] References Cited

U.S. PATENT DOCUMENTS

| | | | |
|---|---|---|---|
| 5,369,761 | 11/1994 | Conley et al. | 707/2 |
| 5,414,834 | 5/1995 | Alexander et al. | 707/100 |
| 5,481,703 | 1/1996 | Kato | 707/101 |
| 5,566,333 | 10/1996 | Olson et al. | 707/102 |
| 5,603,025 | 2/1997 | Tabb et al. | 707/2 |
| 5,615,367 | 3/1997 | Bennett et al. | 707/102 |
| 5,619,692 | 4/1997 | Malkemeus et al. | 707/2 |
| 5,625,554 | 4/1997 | Cutting et al. | 707/100 |
| 5,684,964 | 11/1997 | Powers et al. | 1/1 |

OTHER PUBLICATIONS

Shoval, A Methodology for Integration of Binary–Relationship Conceptual Schemas, IEEE, pp. 435–437, Mar. 1990.

Lu et al, Normalization of Linear Recursions in Deductive Databases, IEEE, pp. 559–560, Apr. 1993.

Tok Wang Ling, A normal form for sets of not–necessarily normalized relations IEEE, pp. 578–586, Jan. 1989.

*Primary Examiner*—Thomas G. Black
*Assistant Examiner*—Frantz Coby
*Attorney, Agent, or Firm*—Duft, Graziano & Forest, PC

[57] ABSTRACT

A database normalizing system for transparently normalizing a record source in a database wherein the record source contains a plurality of records and each of the records contains at least one field that is common across each of the records. The database normalizing system includes evaluating data from the record source and suggesting a relational split of the record source in response to evaluating the data therein. Evaluating the data further includes generating a hierarchy of fields organized by field distinctiveness of each field in the record source, adjusting the hierarchy based on field distinctiveness, and promoting fields among levels of the hierarchy based on a data correlation among the fields in each level of the hierarchy.

20 Claims, 11 Drawing Sheets

200, 202, 205, 210, 211, 212, 213, 214, 215, 220, 221, 222, 223, 224

| Employees | | | | | |
|---|---|---|---|---|---|
| **Employee Number** | **Last Name** | **First Name** | **Dept. Number** | **Dept. Name** | **Manager** |
| 001 | Miller | Andrew | 4173 | Project A Development | Bob Gunderson |
| 002 | Kaplan | Dave | 4173 | Project A Development | Bob Gunderson |
| 003 | Warden | Drew | 4173 | Project A Development | Bob Gunderson |
| 004 | Hood | Destry | 4176 | Project A Testing | Gail Kulikowsky |
| 005 | Eng | Michael | 4176 | Project A Testing | Gail Kulikowsky |

| Employees | | | |
|---|---|---|---|
| **Employee Number** | **Last Name** | **First Name** | **Dept. Number** |
| 001 | Miller | Andrew | 4173 |
| 002 | Kaplan | Dave | 4173 |
| 003 | Warden | Drew | 4173 |
| 004 | Hood | Destry | 4176 |
| 005 | Eng | Michael | 4176 |

303, 308, 314, 315, 316, 330, 331

| Departments | | |
|---|---|---|
| **Department Number** | **Department Name** | **Manager** |
| 4173 | Project A Development | Bob Gunderson |
| 4176 | Project A Testing | Gail Kulikowsky |

| Email (1011) | First Name (1012) | Last Name (1013) | Phone (1014) | Room (1015) | Reports To (1016) | Dept ID (1017) | Department (1018) | Has Window (1019) |
|---|---|---|---|---|---|---|---|---|
| mattsen | Matt | Senft | 697-3486 | 18W/3104 | matthewb | 4179 | Jet Development | Yes |
| fetand | Ketan | Dalal | 638-5495 | 18W/3099 | matthewb | 4179 | Jet Development | Yes |
| charun | Charumathy | Narayanan | 252-3588 | 18W/3037 | mjohns | 4179 | Jet Development | Yes |
| bradha | Brad | Hammond | 541-7033 | 18W/3044 | mjohns | 4179 | Jet Development | No |
| bobcr | Bob | Crawford | 142-9202 | 18W/3090 | ghsmith | 4179 | Jet Development | Yes |
| theresak | Theresa | Knecht | 143-9503 | 18W/3052 | theresak | 4178 | Jet General Manager | No |
| darmeyer | Darlene | Meyer | 881-8727 | 18W/3053 | theresak | 4178 | Jet General Manager | No |
| a-markbu | Mark | Bukovec | 841-2379 | 18N/3309 | trudyah | 4180 | Jet Program Management | Yes |
| a-ronb | Ron | Bourret | 150-8518 | 18N/3309 | trudyah | 4180 | Jet Program Management | No |
| dant | Dan | Tyack | 330-4125 | 18W/3018 | dennisco | 4180 | Jet Program Management | No |
| sujays | Sujay | Sahni | 723-3955 | 18W/3127 | jburnett | 4181 | Jet Testing | No |
| lauraham | Laura | Hammond | 163-6228 | 18W/3105 | jburnett | 4181 | Jet Testing | Yes |
| kellyt | Kelly | Tipton | 748-3414 | 18W/3147 | leewoods | 4181 | Jet Testing | Yes |
| jamalk | Jamal | Kothia | 344-3307 | 18W/3101 | jburnett | 4181 | Jet Testing | Yes |

| | FIELDNAME (1110) | L/S (1111) | PL/PS (1112) | FL/FS (1113) | AVG (1114) | DIST (1115) | LOG (1116) |
|---|---|---|---|---|---|---|---|
| 1011 | Email | 1/1 | -/- | -/- | 6 | 84 | 13 |
| 1012 | First Name | 1/1 | -/- | -/- | 5 | 76 | 12 |
| 1013 | Last Name | 1/1 | -/- | -/- | 6 | 82 | 13 |
| 1014 | Phone | 1/1 | -/- | -/- | 8 | 84 | 13 |
| 1015 | Room | 1/1 | -/- | -/- | 8 | 76 | 12 |
| 1016 | Reports To | 1/1 | -/- | -/- | 7 | 15 | 8 |
| 1017 | Dept ID | 1/1 | -/- | -/- | 2 | 7 | 5 |
| 1018 | Department | 1/1 | -/- | -/- | 15 | 7 | 5 |
| 1019 | Has Window | 1/1 | -/- | -/- | 1 | 2 | 2 |

| | FIELDNAME (1110) | L/S (1111) | PL/PS (1112) | FL/FS (1113) | AVG (1114) | DIST (1115) | LOG (1116) | |
|---|---|---|---|---|---|---|---|---|
| 1014 | Phone | 1/1 | -/- | -/- | 8 | 84 | 13 | 1210 |
| 1013 | Last Name | 1/1 | -/- | -/- | 6 | 82 | 13 | 1210 |
| 1011 | Email | 1/1 | -/- | -/- | 6 | 84 | 13 | 1210 |
| 1012 | First Name | 1/1 | -/- | -/- | 5 | 76 | 12 | 1210 |
| 1015 | Room | 1/1 | -/- | -/- | 8 | 76 | 12 | 1210 |
| 1016 | Reports To | 2/1 | 0/0 | -/- | 7 | 15 | 8 | 1211 |
| 1018 | Department | 3/1 | 0/0 | -/- | 15 | 7 | 5 | 1212 |
| 1017 | Dept ID | 3/1 | 0/0 | -/- | 2 | 7 | 5 | 1212 |
| 1019 | Has Window | 4/1 | 0/0 | -/- | 1 | 2 | 2 | 1213 |

| FIELDNAME | L/S | PL/PS | FL/FS | AVG | DIST | LOG | |
|---|---|---|---|---|---|---|---|
| Room | 1/1 | -/- | -/- | 8 | 76 | 12 | 1310 |
| Last Name | 1/1 | -/- | -/- | 6 | 82 | 13 | 1310 |
| Email | 1/1 | -/- | -/- | 6 | 84 | 13 | 1310 |
| First Name | 1/1 | -/- | -/- | 5 | 76 | 12 | 1310 |
| Phone | 1/1 | -/- | -/- | 8 | 84 | 13 | 1310 |
| Reports To | 1/1 | -/- | -/- | 7 | 15 | 8 | 1310 |
| Has Window | 1/1 | -/- | -/- | 1 | 2 | 2 | 1310 |
| Dept ID | 2/1 | 0/0 | -/- | 2 | 7 | 5 | 1311 |
| Department | 2/1 | 0/0 | -/- | 15 | 7 | 5 | 1311 |

| FIELDNAME | L/S | PL/PS | FL/FS | AVG | DIST | LOG |
|---|---|---|---|---|---|---|
| Email | 1/1 | -/- | -/- | 6 | 84 | 13 |
| First Name | 1/1 | -/- | -/- | 5 | 76 | 12 |
| Last Name | 1/1 | -/- | -/- | 6 | 82 | 13 |
| Phone | 1/1 | -/- | -/- | 8 | 84 | 13 |
| Room | 1/1 | -/- | -/- | 8 | 76 | 12 |
| Reports To | 1/1 | -/- | -/- | 7 | 15 | 8 |
| Has Window | 1/1 | -/- | -/- | 1 | 2 | 2 |
| >Dept ID | 1/1 | -/- | 2/1 | 0 | 0 | 0 |
| +Dept ID | 2/1 | 1/1 | -/- | 2 | 7 | 5 |
| Department | 2/1 | 1/1 | -/- | 15 | 7 | 5 |

1310 (Email through >Dept ID); 1311 (+Dept ID, Department); 1411 (>Dept ID); 1410 (+Dept ID)

*FIG. 14*

1500; 1510 (rows); columns 1511, 1512, 1513, 1514, 1515, 1516, 1517

| Course # | Title | Units | Student ID | First Name | Last Name | Grade |
|---|---|---|---|---|---|---|
| 1001 | Mathematics | 9 | 1313131313 | Michael | Mee | D |
| 1002 | Physics | 9 | 1616161616 | Jacqueline | Pierce | E |
| 1002 | Physics | 9 | 1717171717 | Craig | Fleischman | A- |
| 2000 | Chemistry | 6 | 1818181818 | Jason | Zander | C+ |
| 2000 | Chemistry | 6 | 1919191919 | Moshe | Feuer | C |
| 1002 | Physics | 9 | 2020202020 | Scott | Beste | C |
| 2000 | Chemistry | 6 | 2020202020 | Scott | Beste | C |
| 1001 | Mathematics | 9 | 2222200000 | Mike | Uhlar | C+ |
| 2000 | Chemistry | 6 | 2323232323 | Wlodek | Nakonieczny | B+ |
| 1001 | Mathematics | 9 | 3333300000 | Nigel | Ellis | A- |
| 1001 | Mathematics | 9 | 4444400000 | Paul | Archer | A- |

*FIG. 15*

1600; columns 1610, 1611, 1612, 1613, 1614, 1615, 1616

| FIELDNAME | L/S | PL/PS | FL/FS | AVG | DIST | LOG |
|---|---|---|---|---|---|---|
| 1516 Last Name | 1/1 | -/- | -/- | 6 | 30 | 10 |
| 1514 Student ID | 1/1 | -/- | -/- | 10 | 30 | 10 |
| 1515 First Name | 1/1 | -/- | -/- | 5 | 30 | 10 |
| 1517 Grade | 2/1 | 0/0 | -/- | 1 | 11 | 7 |
| 1511 Course # | 2/1 | 0/0 | -/- | 2 | 13 | 7 |
| 1512 Title | 2/1 | 0/0 | -/- | 10 | 10 | 6 |
| 1513 Units | 3/1 | 0/0 | -/- | 2 | 4 | 4 |

1620 (Last Name, Student ID, First Name); 1621 (Grade, Course #, Title); 1622 (Units)

| FIELDNAME | L/S | PL/PS | FL/FS | AVG | DIST | LOG | |
|---|---|---|---|---|---|---|---|
| +ID (1710) | 1/1 | -/- | -/- | 4 | 175 | 15 | 1720 |
| First Name | 2/1 | 0/0 | -/- | 5 | 30 | 10 | 1721 |
| Student ID | 2/1 | 0/0 | -/- | 10 | 30 | 10 | |
| Last Name | 2/1 | 0/0 | -/- | 6 | 30 | 10 | |
| Title | 3/1 | 0/0 | -/- | 10 | 10 | 6 | 1722 |
| Course # | 3/1 | 0/0 | -/- | 2 | 13 | 7 | |
| Grade | 3/1 | 0/0 | -/- | 1 | 11 | 7 | |
| Units | 4/1 | 0/0 | -/- | 2 | 4 | 4 | 1723 |

| FIELDNAME | L/S | PL/PS | FL/FS | AVG | DIST | LOG | |
|---|---|---|---|---|---|---|---|
| +ID | 1/1 | -/- | -/- | 4 | 175 | 15 | 1920 |
| First Name | 2/1 | 0/0 | -/- | 5 | 30 | 10 | 1921 |
| Student ID | 2/1 | 0/0 | -/- | 10 | 30 | 10 | |
| Last Name | 2/1 | 0/0 | -/- | 6 | 30 | 10 | |
| 1511 Course # | 3/1 | 0/0 | -/- | 2 | 13 | 7 | 1922 |
| 1512 Title | 3/1 | 0/0 | -/- | 10 | 10 | 6 | |
| 1517 Grade | 3/2 | 0/0 | -/- | 1 | 11 | 7 | |
| Units | 4/1 | 0/0 | -/- | 2 | 4 | 4 | 1923 |

| FIELDNAME | L/S | PL/PS | FL/FS | AVG | DIST | LOG | |
|---|---|---|---|---|---|---|---|
| 1517 Grade | 1/1 | -/- | -/- | 1 | 11 | 7 | 1920 |
| +ID | 1/1 | -/- | -/- | 4 | 175 | 15 | |
| Last Name | 2/1 | 0/0 | -/- | 6 | 30 | 10 | 1921 |
| Student ID | 2/1 | 0/0 | -/- | 10 | 30 | 10 | |
| First Name | 2/1 | 0/0 | -/- | 5 | 30 | 10 | |
| Title | 3/1 | 0/0 | -/- | 10 | 10 | 6 | 1922 |
| 1516 Units | 3/1 | 0/0 | -/- | 2 | 4 | 4 | |
| Course # | 3/1 | 0/0 | -/- | 2 | 13 | 7 | |

FIG. 19

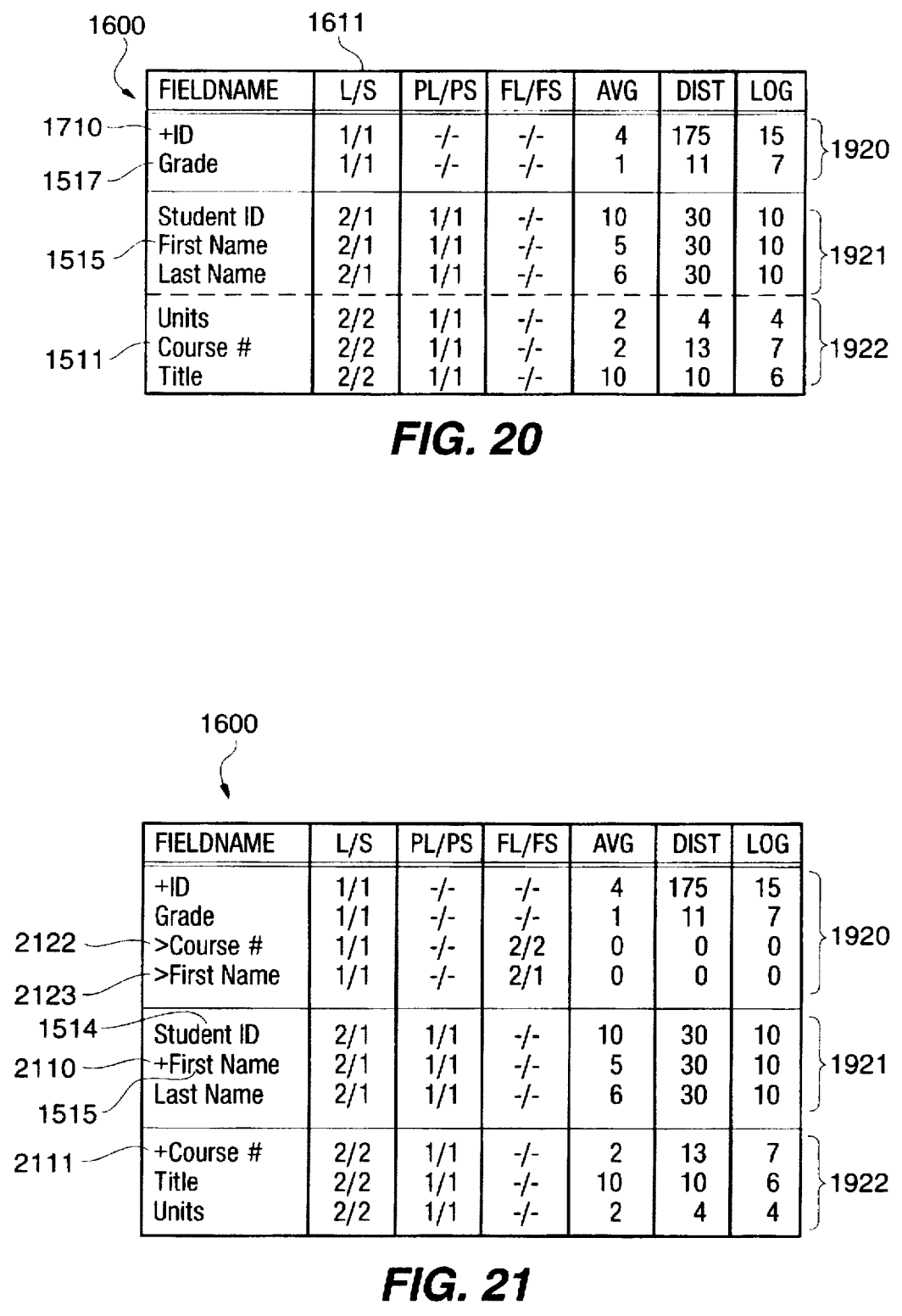

| FIELDNAME | L/S | PL/PS | FL/FS | AVG | DIST | LOG |
|---|---|---|---|---|---|---|
| +ID | 1/1 | -/- | -/- | 4 | 175 | 15 |
| Grade | 1/1 | -/- | -/- | 1 | 11 | 7 |
| Student ID | 2/1 | 1/1 | -/- | 10 | 30 | 10 |
| First Name | 2/1 | 1/1 | -/- | 5 | 30 | 10 |
| Last Name | 2/1 | 1/1 | -/- | 6 | 30 | 10 |
| Units | 2/2 | 1/1 | -/- | 2 | 4 | 4 |
| Course # | 2/2 | 1/1 | -/- | 2 | 13 | 7 |
| Title | 2/2 | 1/1 | -/- | 10 | 10 | 6 |

*FIG. 20*

| FIELDNAME | L/S | PL/PS | FL/FS | AVG | DIST | LOG |
|---|---|---|---|---|---|---|
| +ID | 1/1 | -/- | -/- | 4 | 175 | 15 |
| Grade | 1/1 | -/- | -/- | 1 | 11 | 7 |
| >Course # | 1/1 | -/- | 2/2 | 0 | 0 | 0 |
| >First Name | 1/1 | -/- | 2/1 | 0 | 0 | 0 |
| Student ID | 2/1 | 1/1 | -/- | 10 | 30 | 10 |
| +First Name | 2/1 | 1/1 | -/- | 5 | 30 | 10 |
| Last Name | 2/1 | 1/1 | -/- | 6 | 30 | 10 |
| +Course # | 2/2 | 1/1 | -/- | 2 | 13 | 7 |
| Title | 2/2 | 1/1 | -/- | 10 | 10 | 6 |
| Units | 2/2 | 1/1 | -/- | 2 | 4 | 4 |

*FIG. 21*

DATABASE NORMALIZING SYSTEM

FIELD OF THE INVENTION

This invention relates to the field of database management and in particular to a system for normalizing a relational database.

PROBLEM

A database is a collection of related data typically stored on a non-volatile memory medium. Data in the database are commonly organized in a two-dimensional row and column form called a table. A row in the table is called a record and a column in the table is a field. Thus, a field is a subdivision of a record to the extent that a column of data in the table is associated with the same field for each record in the table and a specific datum in a table is referenced by identifying a specific record and a field name. Because a table is a source and/or destination of data in the database, a table is an object in the database that can be generically referred to as a record source.

A relational database is a common database type managed by a database management system. One important characteristic of a relational database is that the data therein is relationally distributed among multiple record sources that are normalized in a manner designed to minimize redundant data in the database, minimize the space required to store data in the database, and maximize data integrity. A normalized database is one where each record source in the database is directly related to at least one other record source in the same database by key fields. A key field can be a primary key or a foreign key. A primary key is the one field or combination of fields in a record source that contains unique data for each record in the record source. A foreign key is a field or combination of fields in a record source that is the basis for a direct relation with any other record source's primary key.

A relationship, also referred to as a relation or join, between any two record sources in a relational database is either a direct relationship or an indirect relationship. A direct relationship exists between a first record source and a second record source if there is no intervening record source in the relationship path therebetween. An indirect relationship exists between a first record source and a second record source if there is at least one intervening record source in the relationship path therebetween. The record sources in a relational database and the relations therebetween collectively define the geography of a database called a schema or database schema that is typically visually displayed or conceptually thought of in a hierarchical graphic form having multiple levels and sub-levels such as in a tree or graph.

Normalizing a database is the process of identifying redundant data among records in a record source and splitting the record source into at least two new record sources, such that redundant data is consolidated in the resultant record sources, and where the record sources are linked by primary key—foreign key relationships. One advantage of a normalized database is that data in the database requires less storage space on a memory medium. Another advantage of a normalized database is that minimizing redundant data in the database increases the overall integrity of data because independent pieces of duplicative data can not be independently modified.

Normalizing a database is presently a task that requires manual intervention by a database user who thoroughly understands the database schema including record source names, relationships, and field names, and the semantics of all the data within the record sources and fields. One problem with normalizing a database is that a relatively simple database can contain complex relationships and dependencies so that even experienced database users can have difficulty determining where to normalize the database. Another problem with normalizing a database is that implementing the normalization and re-establishing new relationships between normalized record sources is a complex process. Further, the need for manual intervention to determine where and how to normalize a database means that details of the database schema are not transparent to the user which is more database knowledge than the average commercial database user is often able or willing to accommodate.

For these reasons, a normalizing system is desirable that can determine when and where to normalize a database in addition to implementing the normalization in a way that is transparent to the database user. Such a normalizing system has heretofore not been realized prior to the present disclosure.

SUMMARY

The above identified problems are solved and a technical advance achieved in the field by the database normalizing system of the present invention. The database normalizing system facilitates normalizing a database containing data in at least one record source wherein a schema of the database is defined by each record source in the database and any relationship therebetween. The system comprises a method and apparatus for evaluating the data from a record source in the database and for suggesting to a user of the database a relational split of the record source. Evaluating data in the database further includes generating a hierarchy of fields from the record source where the hierarchy is organized by the distinctiveness of each field in the record source, adjusting the hierarchy to accommodate speciality field distinctiveness cases, and promoting fields among levels in the hierarchy based on the determinance of each field in each record source.

BRIEF DESCRIPTION OF THE DRAWINGS

FIG. 2 illustrates a non-normalized database in table form;

FIG. 3 illustrates a normalized database in table form;

FIGS. 10–14 illustrate an employee record source normalization example; and

FIGS. 15–21 illustrate a student record source normalization example.

DETAILED DESCRIPTION

Figure 1:
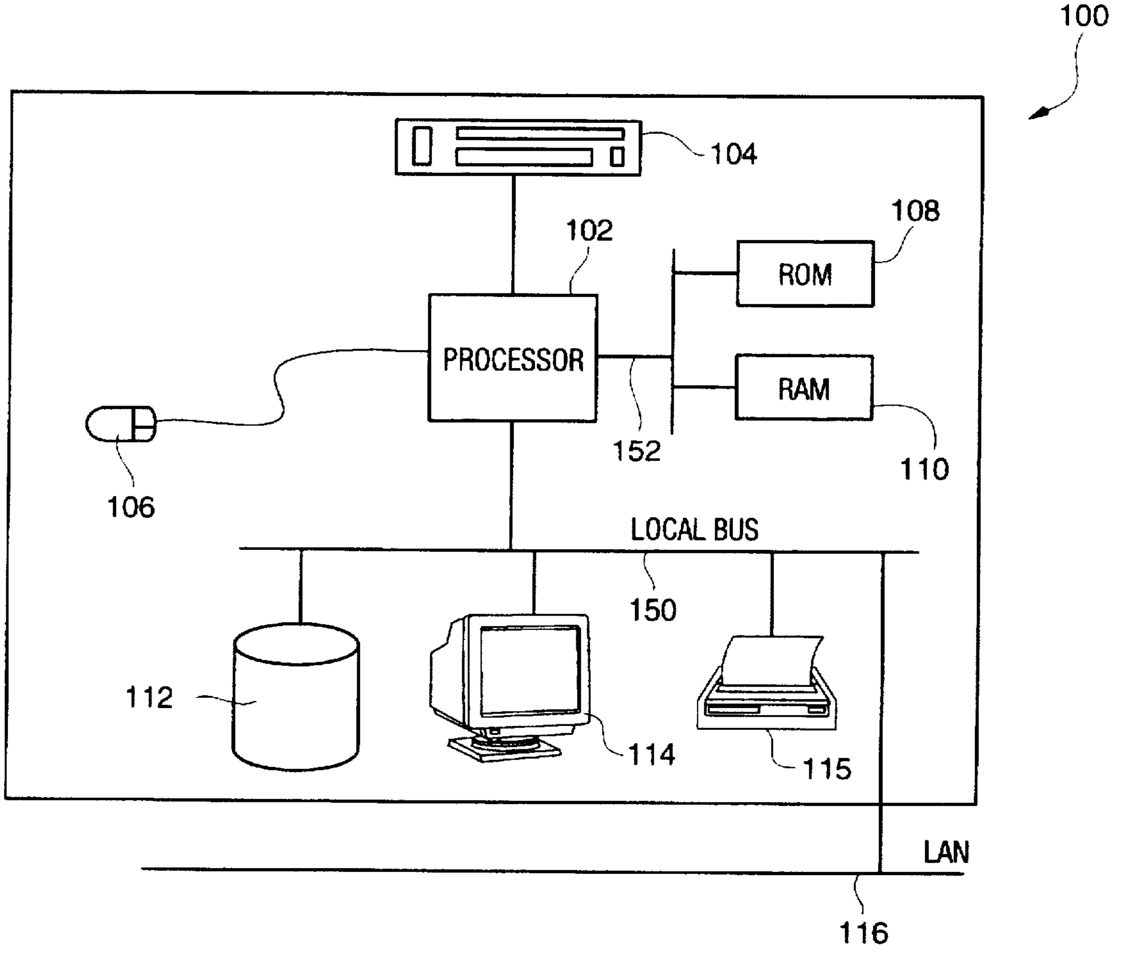
FIG. 1 illustrates a database computing environment in block diagram form.

Database Computing Environment—FIG. 1

FIG. 1 illustrates a block diagram example of a computer system 100 in a database computing environment. The database normalizing system of the present invention is operable in any of several standard computing systems readily available in the industry such as computer system 100. Programmed instructions for the database normalizing system are executable on processor 102. Processor 102 stores and/or retrieves the programmed instructions and/or data from memory devices that include, but are not limited to, Random Access Memory (RAM) 110 and Read Only Memory (ROM) 108 by way of memory bus 152. Another accessible memory device includes non-volatile memory device 112 by way of local bus 150. User input to computer system 100 is entered by way of keyboard 104 and/or pointing device 106. Human readable output from computer system 100 is viewed on display 114 or in printed "report" form on local printer 115. Alternatively, computer system 100 is accessible for user input and/or generating human readable displays in printed and/or display screen output form or any other output form by way of Local Area Network (LAN) 116 in a manner well known in distributed computing and computer network art.

Normalized Database Background—FIGS. 2–3

FIG. 2 illustrates a non-normalized database 200 in two-dimensional table form. Database 200 includes one record source 202 called the Employees record source because the record source contains employee information as identified by the Employees record source name 205. The Employees record source 202 is illustrated as having five records 220–224 where each record contains information for a single employee. Each record 220–224 is divided by six fields 210–215 including an Employee Number field 210, a Last Name field 211, a First Name field 212, a Department Number field 213, a Department Name field 214, and a Manager field 215. The Employee Number field 210 is the only field in the Employees record source 202 that is designed to contain unique data across each record 220–224. Thus, the Employee Number field 210 is a primary key field. Because database 200 contains only one record source and because the Employees record source 202 has the likelihood of containing redundant data in any one of the Department Number 212, Department Name 213, and/or Manager 214 fields, database 200 is an example of a non-normalized or flat file database.

FIG. 3 illustrates a normalized database 300 in two-dimensional table form. Database 300 includes an Employees record source 302 containing employee information as identified by the Employees record source name 305, and a Departments record source 303 containing department information as identified by the Departments record source name 308. The Employees record source 302 is illustrated as having five records 320–324 where each record contains personal information for a single employee. Each record 320–324 is divided by four fields 310–313 including an Employee Number field 310, a Last Name field 311, a First Name field 312, and a Department Number field 313. The Employee Number field 310 is the only field in the Employees record source 302 that is designed to contain unique data across each record 320–324. Thus, the Employee Number field 310 is the primary key field for the Employees record source 302. The Department Number field 313 in the Employees record source 302 does not contain unique data for each record 320–324 although the field is a foreign key field for the Employees record source 302 for the reasons discussed below.

Departments record source 303 is illustrated as having two records 330–331 where each record contains detailed information for a single department. Each record 330–331 is divided by three fields 314–316 including a Department Number field 314, a Department Name field 315, and a Manager field 316. The Department Number field 314 is the only field in the Departments record source 303 that is designed to contain unique data across each record 330–331. Thus, the Department Number field 314 is the primary key field for the Departments record source 303. Alternatively, the Department Name field 315 could also contain unique data for each record 330–331 by design, or the combination of the Department Number field 314 and the Department Name field 315 together could create a unique primary key for the Departments record source 303. However, the FIG. 3 illustration shows the Department Number field 314 in the Departments record source 303 as the primary key and the Department field 313 in the Employees record source 302 as the related foreign key. The significance of the relationship between a primary key field and foreign key field in the present illustration where the relationship has a 1-to-many cardinality, is that there need only be one complete record of department information regardless of the number of employees that are in any one department. Therefore there is a memory savings and a minimization of redundant data by splitting out the department information into a separate Departments record source 303 from the Employees record source 302. The splitting of record sources in the manner described above is characteristic of a normalized database.

Figure 4:
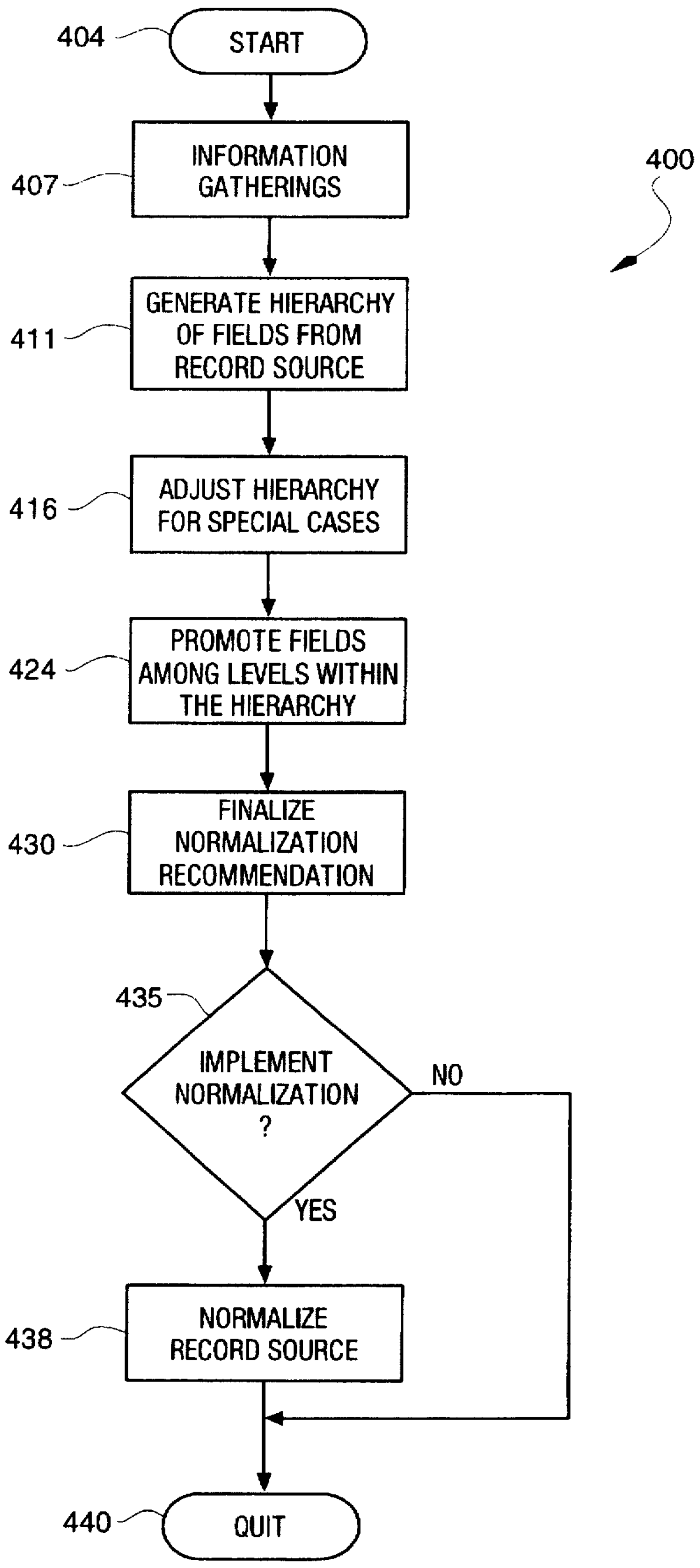
FIG. 4 illustrates an overview of the database normalization operational steps in flow diagram form.

Database Normalizing Operational Steps—FIG. 4

FIG. 4 illustrates an overview of the database normalizing system operational steps 400 in flow diagram form. The database normalizing system begins at step 404 and proceeds to information gathering for a selected record source at step 407. Details of the information gathering step 407 are discussed further in the text accompanying FIG. 5. The database normalizing system generates a hierarchy of fields from the selected record source and groups the fields into levels at step 411. Details of the hierarchy generating step 411 are discussed further in the text accompanying FIG. 6. The hierarchy of fields is adjusted to accommodate special cases at step 416. Details of the hierarchy adjustment step 416 are discussed further in the text accompanying FIG. 7. At step 424, certain of the fields in the hierarchy are promoted among the levels in the hierarchy as needed to clarify the grouping of fields in each level of the hierarchy. Details of the field promoting step 424 are discussed further in the text accompanying FIG. 8. The database normalizing system formalizes its normalization recommendation at step 430. Details of the normalizing recommendation step 430 are discussed further in the text accompanying FIG. 9.

At decision step 435, the database user can be prompted for authorization to proceed with implementing the normalization recommendation. Alternatively, database user authorization can be predetermined as an default option or other parameter to eliminate the need for a real time user prompt. If the database user does not wish to have the database normalized according to the present recommendation by the database normalizing system, then processing continues at step 440 where the present normalizing recommendation is abandon. If the database user wishes to have the database normalized according to the present normalization recommendation, then processing continues at step 438 where the normalization recommendation is implemented and the present normalization process is complete at step 440.

The text accompanying FIGS. 5–9 discuss the basic steps taken to generate a normalization recommendation. The text accompanying FIGS. 10–14 demonstrate an example of the database normalizing system 500 in operation with a database example. Because not all steps of the database normalizing system 500 are readily seen in one example, the text accompanying FIGS. 15–21 demonstrate a second example of the database normalizing system 500 in operation with a second database example.

Figure 5:
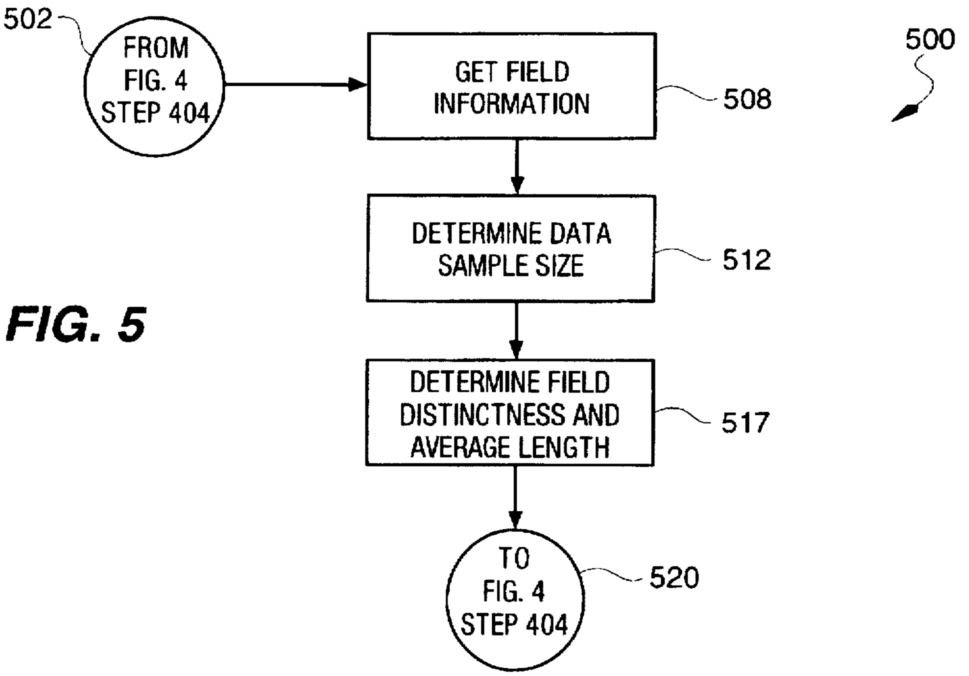
FIG. 5 illustrates information gathering and initialization steps in flow diagram form.

Information Gathering—FIG. 5

FIG. 5 illustrates the information gathering and initialization steps 500 of the database normalizing system 400 in flow diagram form. The information gathering steps 500 begin at step 502 and are the details of step 404 from FIG. 4. It is important to note that the database normalizing system 400 operates on any one record source in the database at a time. At step 508, field information is gathered from the record source that is the focus of the present iteration of the database normalizing system. Field information includes, but is not limited to, field names, data types for each field, and the original column order for each field. Field names are needed so that new record sources resulting from normalization, contain the original field names. Data types are needed so that the database normalizing system understands what type of data is being evaluated in subsequent steps. The original column order for each field is needed to preserve the column order in subsequent record sources resulting from normalization.

At step 512, the database normalizing system determines a sample size of records to analyze because it is not necessary to analyze all data in the record source in its entirety. A sample size is based on the width of the record source where the width is defined in terms of the number of fields. As a general rule the fewer the number of fields in the record source, the larger the sample size. For example, for a record source with fewer than 20 fields, a sample size of about 600 rows of data might be analyzed either randomly or consecutively. Alternatively for example, for a record source with more than 20 fields, a sample size of about 300 rows of data might be analyzed randomly or consecutively. The sample need only be a large enough segment of the data to provide a reliable assessment of the data in each field in the record source. The speed in which the analysis can be completed is another key factor in selecting a sample size because the larger the sample size the longer the analysis time. Regarding the type of sampling, random sampling is preferred over consecutive. However, the error resulting due to a consecutive row analysis is considered harmless because the worse case result of a consecutive row analysis is an original record source that is subdivided into more record sources which is a desirable end. For record sources with too few records, such as fewer than 2 rows of data, processing can be discontinued because the there is not enough data for a meaningful analysis.

Field distinctness and the average field length is determined for each field in the record source at step 517. Field distinctness is the number of distinct or otherwise unique data values in the field and applies primarily to non-null fields. The number of null versus non-null fields are determined for later use. The field distinctness is used to gather fields of similar distinctness into groups.

The distinctness counts are each log-scaled to clarify the field distinctness groups. For example, using a small log-base of 1.4 will group high distinctness count fields of 800, 900, or 1000 together while separating fields with low distinctness counts of 10, 15, or 20.

The average length of data in each field excludes null data values to avoid skewing the resulting average. The average lengths are used in later steps to elect key fields and to prevent small fields from being unnecessarily normalized. Processing continues at step 520 by returning to step 404 in FIG. 4.

Figure 6:
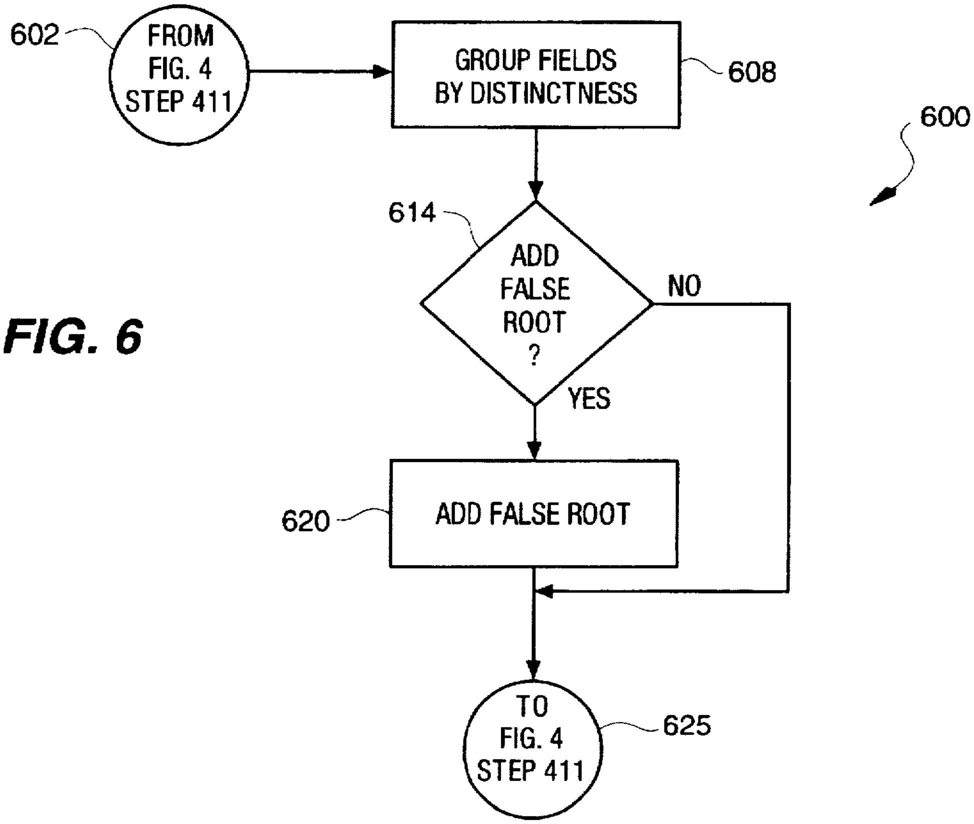
FIG. 6 illustrates hierarchy generating steps in flow diagram form.

Generating a Hierarchy of Fields—FIG. 6

FIG. 6 illustrates the field hierarchy generating steps 600 of the database normalizing system 400 in flow diagram form. The field hierarchy generating steps 600 begin at step 602 and are the details of step 411 from FIG. 4. At step 608, fields with similar distinctness counts are grouped together as a first field grouping estimate. The similarity among distinctness counts is based on the log-scaled distinctness counts from step 517. Specifically, any two fields having similar log-scaled distinctness counts are grouped together except when one of the following situations exists: 1) the two fields have log-scaled distinctness counts that differ by more than one; 2) the range of log-scaled distinctness counts within a given group is more than two; 3) the range of log-scaled distinctness counts within a given group is more than one and the group is growing too large relative to other groups, for example more than 5–8 fields already in the group; and 4) the log-scaled distinctness counts are all low, for example less than about 4, or the number of rows in the record source are low, for example less than about 30. The result of grouping by log-scaled distinctness counts is that the fields within the record source are now organized hierarchically as levels in a linear tree with the most distinct fields in level 1 or root level.

A determination is made at decision step 614 whether a false root level is required or not. The root level must be occupied by the field with the maximum distinctness count and a false root in needed only if the field with the highest distinctness count is not distinct enough. For example, if at decision step 614 it is determined that the distinctness grouping of fields in step 608 has identified a field with the maximum distinctness count, then processing continues at step 625 by returning to step 411 in FIG. 4. Alternatively, if at decision step 614 no field with a maximum distinctness count or is not distinctive enough is the result of the distinctness grouping of step 608, then a false root is created and all remaining levels are moved down one level in the hierarchy. An example of a field that is not distinct enough is if the most distinct field has a distinctness count of less than about 80–90% of distinctiveness relative to the sample size. Processing continues at step 625 by returning to step 411 in FIG. 4.

Figure 7:
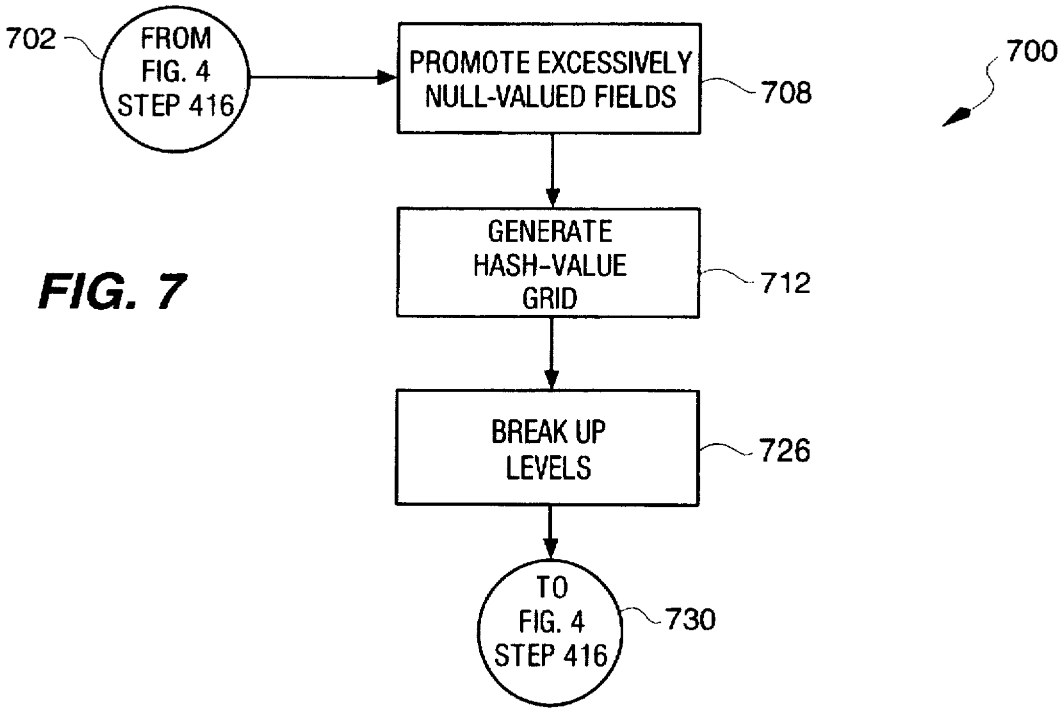
FIG. 7 illustrates hierarchy adjustment steps in flow diagram form.

Hierarchy Adjustment Steps—FIG. 7

FIG. 7 illustrates the hierarchy adjustment steps 700 in flow diagram form for accommodating special hierarchy situations by the database normalizing system 400. The hierarchy adjustment steps 700 begin at step 702 and are the details of step 416 from FIG. 4. At step 708, fields that contain primarily null valued data are migrated up into the root level. For example, a field may be considered to have primarily null valued data if the field includes non-text data and/or short text data fields that are about 80–90% null.

At step 712, a grid of integer hash-values is generated to facilitate determining any dependencies that exist among fields in the record source. Because the dependencies are determined by evaluating the actual data in the rows of each field, assigning integer hash-values to the data in each field reduces the time required to evaluate the data because only integer values need be compared rather than the more cumbersome text strings. Further, the hashing technique reduces the chance of mis-evaluating data due to typographical errors in the data. Specifically, the integer hash-value grid is based on the first 20–30 characters of actual data in the rows of each field, and only a sample size, number of rows of data are examined from each field based on the sample size previously determined in step 512. Note however, that the root level fields are not part of the integer hash-value evaluation because the root level already includes distinct fields and opening the door to including additional fields at the root level further complicates rather than benefits the overall normalization process.

The purpose of the hashing is to break down the fields being evaluated into non-text or numeric fields, and text or alpha-numeric fields. For non-text fields of less than or about 2 bytes of data, the data itself can be used as the hash value. Alternatively, for non-text fields of greater than about 2 bytes of data, the hash value is the data exclusive-or ed (XORed) to itself in 2 byte increments which also compresses the data. For text fields, a hash value is assigned based on whether the text is code-string text or word-string text. Code-string text is a string of data that is more than about half non-alphabetic. The hash value for a code-string is a scaled value based on each individual character linearly in view of each characters position in the string, with greater scaling value on characters at the trailing end of the string when evaluating the string from left to right. For example, the code-strings "936-8660" and "936-8661" would hash differently. Word-string text is a string of data that is more than about half alphabetic. The hash value for a word-string is a scaled value based on each individual character linearly in view of each characters position in the string, with greater scaling value on characters at the leading end of the string when evaluating the string from left to right. For example, the word-strings "Pennsylvania" and "Pennsylvanya" would hash similarly.

At step 726, fields previously grouped together in a given level based on distinctiveness counts in step 608 but lack any relation to each other, are iteratively broken up into smaller sub-levels that may contain only one field per level so that only tightly correlated fields remain grouped together. A sub-level can be thought of as one of the branches in the hierarchical graph where the branch or branches originate from a common point that defines the level. Breaking a level into sub-levels is the result of correlation testing. Correlation testing includes synchronization testing and determinance testing. Synchronization testing is a bi-directional correlation test that determines whether two fields from the same distinctness level are closely related enough to justify remaining in the same level. The synchronization testing is performed by selecting a key field that is the most distinct field among the fields in the given level. Ties for the key field designation can be broken by determining which field has the smallest average size data. Once the key field is selected the key field is compared with each other field in the level, called the "data" in this test, in a bi-directional manner such that the key and data change in tandem. Alternatively, determinance testing determines whether one field in a level is merely an attribute of another field in the same level so that the fields are closely related enough to justify remaining in the same level. If the fields are not closely related enough one of the fields could be promoted into a higher level as described in the text accompanying FIG. 8.

Figure 8:
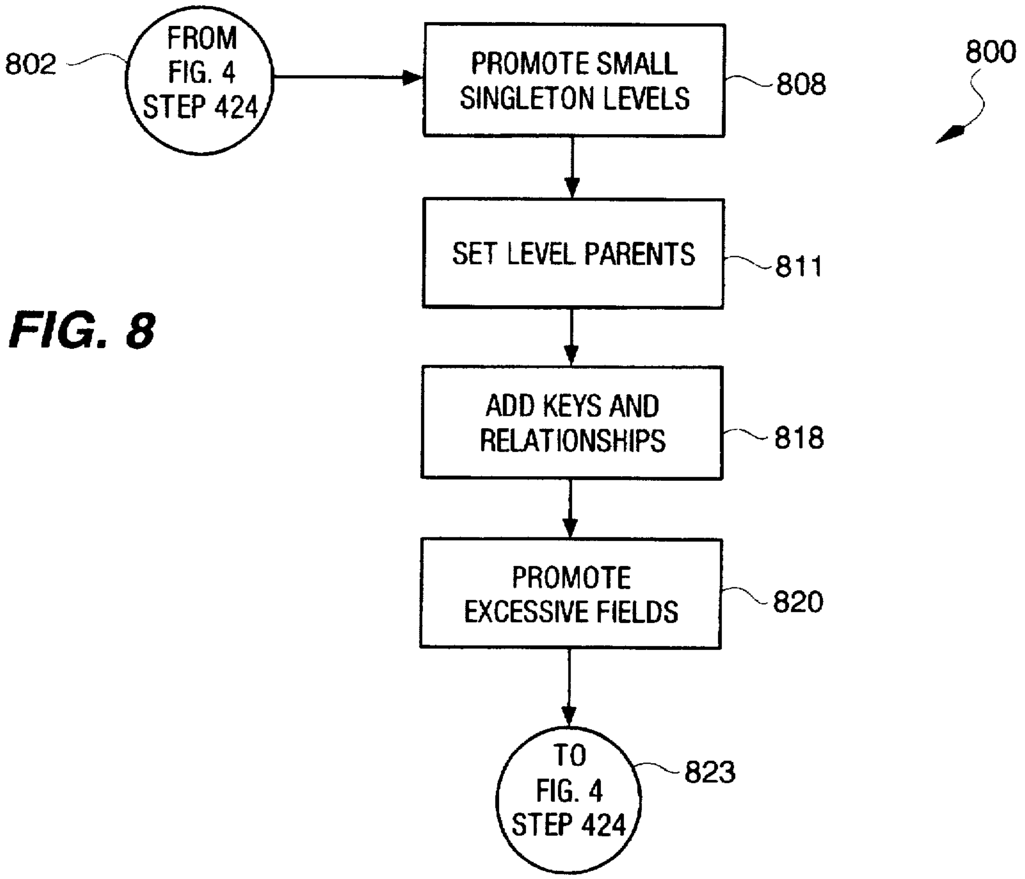
FIG. 8 illustrates field promoting steps among levels in the hierarchy in flow diagram form.

Promoting Fields Among Levels—FIG. 8

FIG. 8 illustrates steps for promoting fields among levels 800 in flow diagram form. The field promoting steps 800 begin at step 802 and are the details of step 424 of FIG. 4.

At step 808, any level or sub-level containing a single field having an attribute of a small average length of data within the field, is promoted into a next higher level based on a two phase data correlation determinance test. A level having a single field is often referred to as a singleton, or singleton level or singleton field. For example, a field having a small average length of data could be a field of less than or about 9 bytes.

The first phase of the data correlation determinance test includes a first pass through all the levels to identify parent levels that could potentially adopt a lower singleton field. A given level is considered able to adopt a lower singleton field if the parent level includes more than one field or the parent level is a large singleton field, and the patent level includes at least one field that would adequately represent the single lower level field in a manner similar to a primary key in a record source. A large singleton field that could be considered a viable parent level if the singleton field has an average data size of at least 8 bytes.

The second phase of the data correlation determinance test includes promoting singleton fields into the previously identified parent level adoption sites and applying the transitivity rule to the adoptions. The second phase itself can be broken into two separate phases of promoting singleton fields and applying the transitivity rule. Transitivity in adopting singleton fields means that as singleton field are promoted starting from the bottom of the hierarchy and working toward the root level, a parent level adoption site and any singleton level it may have adopted move as a unit into subsequent adoptions based on each levels original adoptive status as identified in phase one. For example, if a singleton field "A" at a first level would ordinarily be adopted by a next higher level that includes singleton field "B", and singleton field "B" would ordinarily be adopted by a still higher level that includes fields "C and D", then both fields "A" and "B" must be adopted by the level that includes fields "C and D". The root level absorbs all singleton fields that are not adopted by other non-root levels.

At step 811, a parent field is selected for each level in the hierarchy. The parent field is essentially the key field that determines the given level in the same manner as a primary key in a record source. It may be necessary to perform a field promoting technique within individual levels to identify a parent field for each level.

The division among each level at this point in processing reflects the appearance of individual record sources for each level. Primary key fields are identified for each level at step 818 along with foreign key fields for every other level containing a field pointing to the primary key.

At step 820, fields in excess of a predetermined number of fields per level are promoted up to a level that does not exceed the predetermined number of fields per level. The promotions occur independent of any primary or foreign key distinctions. In one embodiment, if the natural grouping of fields at each level exceeds about 15 fields per level, then the fields in excess of 15 at any given level are promoted upward to the next level until there are less than or about 15 fields per level or until the excess fields end up in the root level. The predetermined number of fields per level is implemented as a practical matter of maintaining a manageable number of fields per record source. However, implementing the excessive field promotion step 820 is not mandatory. Processing continues at step 823 by returning to step 424 in FIG. 4.

Figure 9:
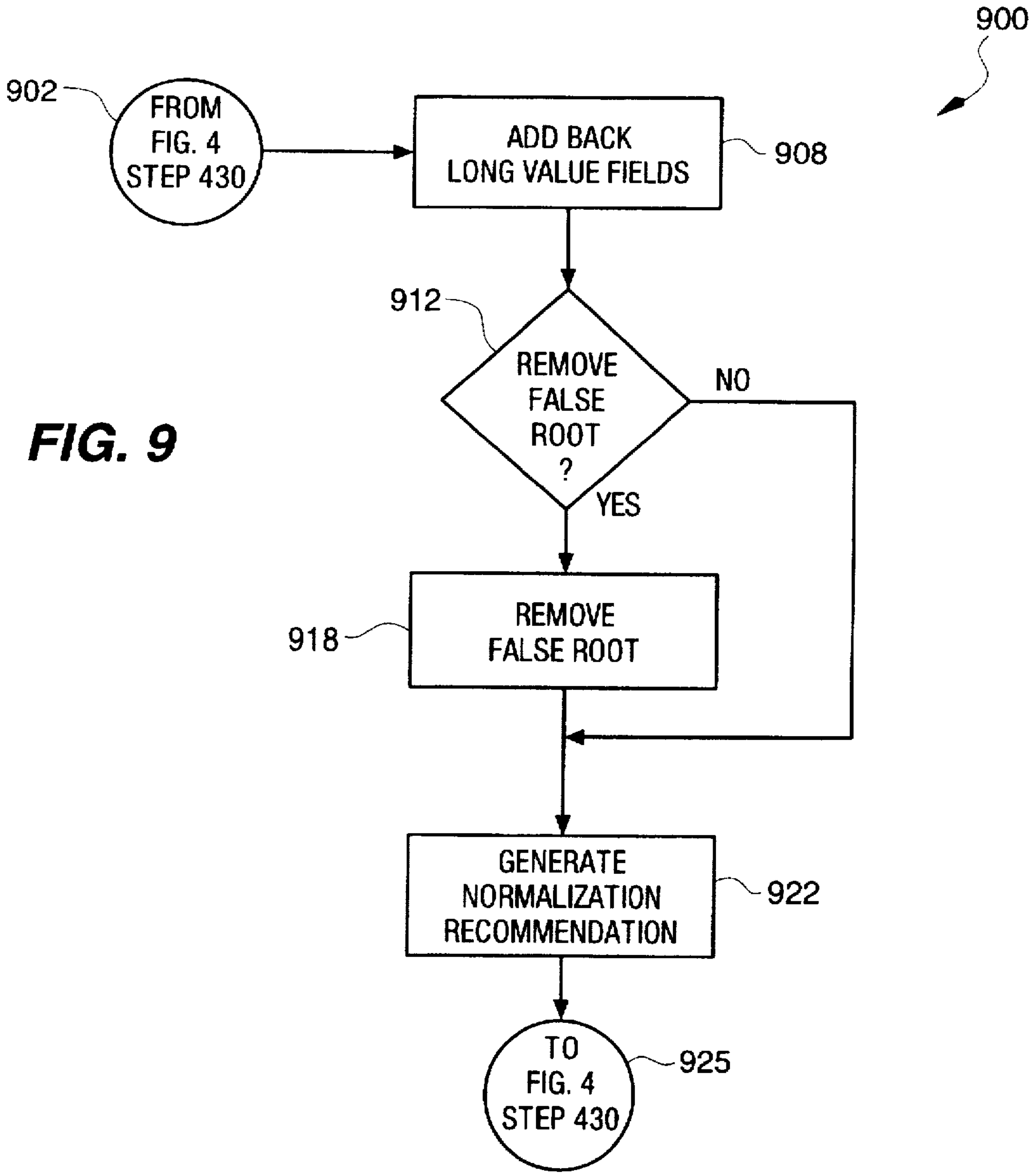
FIG. 9 illustrates steps to finalize the normalization recommendation in flow diagram form.

Finalized Normalization Recommendation—FIG. 9

FIG. 9 illustrates steps for finalizing a normalization recommendation 900 in flow diagram form. The normalization recommendation steps 900 begin at step 902 and are the details of step 430 of FIG. 4. At step 908, fields with long values are added to the root level. Long values are fields of the type "Memo" and "Graphic." For example, a Memo long value can include between about 255 and 32,000 characters, and a Graphic long value can include any binary data greater than about 255 bytes. Because long values always end up in the root level, long value fields can be identified and temporarily removed during the first steps of the overall process to simplify the process up to the present point, and then added back into the process as described below.

If at decision step 912 it is determined that a false root was previously added to the hierarchy at step 620 and no fields presently reside in the root level, then the false root is removed at step 918. If at decision step 912 it is determined that no false root was previously added to the hierarchy at step 620, then processing continues at step 922 where the normalization recommendation is finalized. The finalized normalization recommendation is formatted to include relevant information including, but not limited to, the names and number of resulting record sources, the number of relationships among record sources and the relevant primary and foreign keys, and the field names within each record source. The final normalization recommendation is submitted to the calling process for acceptance and implementation, or rejection. Processing continues at step 925 by returning to step 430 of FIG.4.

Employees Record Source Normalization Example—FIGS. 10–14

FIGS. 10–14 illustrate an employee record source normalization example using the database normalizing system previously defined in the text accompanying FIGS. 1–9. FIG. 10 illustrates the Employees record source 1000 that is the object of the present example, having 9 fields 1011–1019 and 84 total records of which only 14 records 1010 are shown in the present illustration. Note, for purposes of anticipating an outcome of processing the present example by the database normalizing system, the employee information fields 1011–1015 and 1016 and the department information fields 1016–1018 suggest a normalizing opportunity for record source 1000.

FIG. 11 illustrates a table 1100 containing the results of the information gathering step 407 of FIG. 4. Specifically, table 1100 illustrates the basic field information from step 508 including, but not limited to, the name of each field in the FIELDNAME column 1110, and the field order in rows 1011–1019. Table 1100 also illustrates the results of the field distinctness count, the log of the distinctness count, and average field size determinations of step 517, as seen in the DIST column 1115 (distinctness count), LOG column 1116 (log of DIST count), and AVG column 1114 (average field size) respectively for each field 1011–1019. For purposes of the present example, the data sample size determined in step 512 includes all 84 records of the record source.

The remaining columns 1111–1113 of table 1100 contain no useful information at this time. However, note that because all fields 1011–1019 are presently part of the same record source, each level 1011–1019 is listed as being part of level 1 sub-level 1 as illustrated in L/S column 1111 (Level/Sub-level).

FIG. 12 illustrates table 1100 following the hierarchy generating step 411 of FIG. 4. Specifically, the fields 1011–1019 in table 1100 are reordered by their distinctness according to the DIST column 1115 as discussed in step 608. Further as discussed in step 608, the fields 1011–1019 are grouped according to the LOG column 1116 into four groups 1210–1213. The four groups 1210–1213 are also noted in the L/S column 1110 as levels 1/1 (group 1210) containing a plurality of employee information fields, level 2/1 (group 1211) containing a single employee information field, level 3/1 (group 1212) containing a plurality of department information fields, and level 4/1 (group 1213) containing a single employee information field, where each level has only one sub-level. Because the data sampling size of the present example is all 84 records of the record source, and because the maximum distinctness count DIST is 84, there is no need to create a false root as discussed in 614 and 620.

FIG. 12 also illustrates table 1100 following the hierarchy adjustment step 416 of FIG. 4. Specifically, the present example data is relatively free of null values so that the step of promoting excessively null-valued fields in step 708 does not apply. Further, following the hashing step 712 to evaluate the actual data in each field and the level breaking step 726, there is no change among the groups 1210–1213 because the fields in each level are naturally tightly correlated.

FIG. 13 illustrates table 1100 following the field promoting step 424 of FIG. 4. In the present illustration, small single field levels such as field 1016 and 1019 are candidates for adoption by higher levels 1210 and 1212 respectively as discussed in step 808. Specifically, field 1016 is promoted to level 1 since field 1016 was a single field level having a small average length of about 7 bytes. Further, field 1019 is promoted from the lowest level through level 3 and up to level 1 because field 1019 is was a single field level having a small average length of about 1 byte and the data within field 1019 did not correlate well with the data in DeptID 1017. The result of such promotion of single field levels is two levels 1310 and 1311 for employee related information fields and department related information respectively.

FIG. 14 illustrates table 1100 following the further detailed steps of setting parents for levels 811 and adding key relationships 818, all part of step 424 in FIG. 4. In the present illustration, there are only two levels 1310 and 1311 with no sub-levels so that there is no need to identify a parent field for the sub-levels in step 811. However, the DeptID field 1017 is selected as a primary key field 1410 for level 2 (1311) in the adding key relationships step 818, because the DeptID field 1017 has a smaller average length AVG and the more distinct of the choice of fields in level 2 (1311). Similarly, the DeptID field 1017 is added as a foreign key field 1411 to level 1 (1310) to form the basis for the relation between level 1 and level 2 which now look like and are ready to become independent record sources. A primary key is not required for the root level because it is not critical to the normalization recommendation. The remaining step 430 does not apply to the present example.

Student Record Source Normalization Example—FIGS. 15–21

FIGS. 15–21 illustrate a student record source normalization example using the database normalizing system previously defined in the text accompanying FIGS. 1–9. FIG. 15 illustrates the student record source 1500 that is the object of the present example, having 7 fields 1511–1517 and 11 total records 1510.

FIG. 16 illustrates a table 1600 containing the results of the information gathering step 407 of FIG. 4. Specifically, table 1600 contains the basic field information from step 508 including, but not limited to, the name if each field in the FIELDNAME column 1610. Table 1600 also illustrates the results of the field distinctness count, the log of the distinctness count, and average field size determinations of step 517, as seen in the DIST column 1615 (distinctness count), LOG column 1616 flog of DIST count), and AVG column 1614 (average field size) respectively for each field 1511–1517. For purposes of the present example, the data sample size determined in step 512 includes 175 records of a total 175 records in the original record source.

FIG. 16 also illustrates table 1600 following the hierarchy generating step 411 of FIG. 4. Specifically, the fields 1511–1517 in table 1600 are reordered by distinctness according to the DIST column 1615 as discussed in step 608. Further as discussed in step 608, the fields 1511–1517 are grouped according to the LOG column 1616 into three groups 1620–1622. The three groups 1620–1622 are also noted in the L/S column 1610 as levels 1/1 (group 1620) containing a plurality of student information fields, level 2/1 (group 1621) containing a plurality of course information fields, and level 3/1 (group 1622) containing a single course information field, where each level has only one sub-level.

FIG. 17 illustrates table 1600 after adding a false root as discussed in steps 614 and 620. The false root 1710 is added because the data sampling size of the present example is 175 records of 175 total records in the record source, and the maximum distinctness count DIST is only 30. Thus, there exist four levels 1720–1723 once the false root is added.

FIG. 18 illustrates table 1600 following the hierarchy adjustment step 416 of FIG. 4. Specifically, the present example data is relatively free of null values so that the step 708 of promoting excessively null-valued fields does not apply. However, following the hashing step 712 to evaluate the actual data in each field and the level breaking step 726, the grade field 1517 is identified as a sub-field as indicated by the L/S column 1611 as level 3 sub-level 2. The grade field 1517 is now a separate sub-level of the level that includes the sub-levels for the course number field 1511 and the title field 1512, because the bi-directional correlation testing revealed that the grade field 1517 and the course number field 1511 did not change in tandem and are thus not tightly enough linked fields to justify remaining in the same level.

FIG. 19 illustrates table 1600 following the field promoting step 424 of FIG. 4. In the present illustration, small single field levels such as units 1516 and grade 1517 are candidates for adoption by higher levels as discussed in step 808. The units field 1516 is promoted to level 3 (1922) since the units field 1516 was a single field level having a small average length of about 2 bytes. However, the data in the grades field 1517 does not correlate with any other field in level 2 (1921) or level 3 (1922) so that the grades field 1517 is promoted to the false root level 1 (1920). The result of such promotion of single field levels is a three level hierarchy for grade-related fields at level 1 (1920), student related fields at level 2 (1921), and course related fields at level 3 (1922).

FIG. 20 illustrates table 1600 following the further detailed steps of setting parents for levels 811 and adding key relationships 818, all part of step 424 in FIG. 4. In the present illustration, the false root ID field 1710 is selected instead of the grade field 1517 because the ID field 1710 is more distinct and therefore representative all fields in the root level 1 (1920). Prior to identifying a parent or primary key for level 2 or level 3, the linear hierarchy of levels suggests that the course fields in level 3 are a lookup for the student fields in level 2. To determine proper parent-child relationships in the hierarchy, the key field of each level is considered for promotion in the same manner as the determinance testing previously described. Thus, the test in the present example is whether the first name field 1515 determines the course number field 1511. Because it does not, the level 3 fields (1922) are promoted to a parallel sub-level in level 2 (1921) as illustrated in the L/S column 1611.

FIG. 21 illustrates table 1600 following the adding of key fields as discussed in step 818. The first name field 1515 is selected as a primary key field 2110 for level 2/1 (1921) because the first name field 1515 has a smaller average length AVG and is the most distinct of the choice of fields in level 2/1 (1921). However, note that a larger sample size or more statistically realistic data than what exists in the present example could result in the student ID field 1514 as the primary key field for level 2/1 (1921) due to the likelihood of duplicate names in the first name field 1515.

The course number field 1511 is selected as the primary key field 2111 for level 2/2 (1922) because the course number field 1511 has a smaller average length AVG and is the most distinct of the choice of fields in level 2/2 (1922). Finally, both the course number field 1511 and the first name field 1515 are added as foreign key fields 2122 and 2123 respectively to level 1 (1920) to form the basis of the relation between level 1 and pier levels 2/1 and 2/2 which are now ready to become independent record sources. The remaining step 430 does not apply to the present example.

Summary

The database normalizing system of the present invention includes a method and apparatus for evaluating data from a record source in the database and recommending to a user of the database a relational split of the record source in response to evaluating the data. Although specific embodiments are disclosed herein, it is expected that persons skilled in the art can and will design alternative database normalizing systems that are within the scope of the following claims either literally or under the Doctrine of Equivalents.

What is claimed is:

1. A machine readable program storage device tangibly embodying instructions executable by a computer to perform a method for normalizing a record source in a database wherein said record source contains data organized as a plurality of records where each of said plurality of records is subdivided by a plurality of fields that are common across each of said plurality of records, said method comprising:

evaluating a subset of said data from said record source by
- selecting said record source for evaluation from said database;
- determining at least one data attribute of said subset of said data among each of said plurality of fields of said record source;
- generating a hierarchy of said plurality of fields based on a log-scaled field distinctness count of said subset of said data in each said plurality of fields; and
- adjusting said hierarchy of said plurality of fields based on a scaled integer hash-value evaluation of said subset of said data and at least one correlation test of said subset of said data selected from a group of tests consisting of:
  - synchronization testing and determinance testing; and
  - generating a normalization recommendation for said record source for review by a user of said database in response to said step of evaluating said data.

2. A method according to claim 1 including:

implementing said normalization recommendation in response to a user controlled command.

3. A method according to claim 1 wherein said step of determining at least one data attribute includes:

first step of determining field characteristics for each of said plurality of fields in said record source;

second step of determining said subset of said data based on a data subset sample size from among said plurality of records in said record source; and third step of determining said log-scaled field distinctness count for each of said subset of said data in each of said plurality of fields in said record source.

4. A method according to claim 1 wherein said step of generating said hierarchy includes:

ordering said plurality of fields seriatim based on said log-scaled field distinctness count for each of said plurality of fields; and grouping said plurality of fields into at least one hierarchical level and sub-level based on said log-scaled field distinctness count in response to said step of ordering.

5. A method according to claim 4 including:

generating a log-scaled distinctness count for each of said plurality of fields; and grouping at least two fields in a level of said hierarchy based on said log-scaled distinctness count.

6. A method according to claim 1 wherein said step of adjusting said hierarchy includes:

hashing said data sample size of said subset of said data in each of said plurality of fields;

separating any of said plurality of fields in one of said at least one level that has no data correlation with any other of said plurality of fields in said one of said at least one level;

promoting orphan fields having small average field lengths into a higher level having at least one field therein; and determining a key field for each of said at least one level in said hierarchy.

7. A method according to claim 6 including:

relating a first level of said hierarchy to a second level of said hierarchy by said key field in each of said at least one level of said hierarchy.

8. A computer readable program storage device containing instructions for controlling a computer system to perform the method of claim 6.

9. A system for normalizing a record source in a database wherein said record source contains data organized as a plurality of records where each of said plurality of records is subdivided by at least one field that is common across each of said plurality of records, said system comprising:

means for evaluating a subset of said data from said record source by means for selecting said record source for evaluation from said database;

means for determining at least one data attribute of said subset of said data among each of said at least one field of said record source;

means for generating a hierarchy of said plurality of fields based on a log-scaled field distinctness count of said subset of said data in each said plurality of fields; and means for adjusting said hierarchy of said plurality of fields based on a scaled integer hash-value evaluation of said subset of said data and at least one correlation test of said subset of said data selected from a group of tests consisting of: synchronization testing and determinance testing; and means for generating a normalization recommendation for said record source for review by a user of said database in response to said step of evaluating said data.

10. A system according to claim 9 including:

means for implementing said normalization recommendation in response to a user controlled command.

11. A system according to claim 9 wherein said means for evaluating includes:

means for selecting said record source for evaluation from said database;

means for determining at least one data attribute of said data among each of said at least one field of said record source;

means for generating a hierarchy of said at least one field wherein said hierarchy is organized by a field distinctiveness of each said at least one field; and means for adjusting said hierarchy of said at least one field based on a correlation of data among each of said at least one field.

12. A system according to claim 9 wherein said means for determining at least one data attribute includes:

first means for determining field characteristics for each of said at least one field in said record source;

second means for determining said subset of said data based on a data subset sample size from among said plurality of records in said record source; and third means for determining said log-scaled field distinctness count for each of said at least one field in said record source.

13. A system according to claim 9 wherein said means for generating said hierarchy includes:

means for ordering said plurality of fields seriatim based on said log-scaled field distinctness count for each of said plurality of fields; and means for grouping said plurality of fields into at least one hierarchical level and sub-level based on said log-scaled field distinctness count in response to said step of ordering.

14. A system according to claim 13 including:

means for generating said log-scaled distinctness count for each of said plurality of fields; and means for grouping at least two fields in a level of said hierarchy based on said log-scaled distinctness count.

15. A system according to claim 11 wherein said means for adjusting said hierarchy includes:

means for hashing said data sample size of said data in each of said at least one field;

means for separating any of said at least one field in one of said at least one level that has no data correlation with any other of said at least one field in said one of said at least one level;

means for promoting orphan fields having small average field lengths into a higher level having at least one field therein; and means for determining a key field for each of said at least one level in said hierarchy.

16. A system according to claim 15 including:

means for relating a first level of said hierarchy to a second level of said hierarchy by said key field in each of said at least one level of said hierarchy.

17. A method for normalizing a record source in a database wherein said record source contains data organized as a plurality of records where each of said plurality of records is subdivided by at least one field that is common across each of said plurality of records, said method comprising a plurality of steps continuously executed during operation in a user transparent manner absent human intervention that include:

selecting a subset of data in said record source from among a plurality of record sources in said database;

generating a hierarchy of said at least one field based on a log-scaled field distinctiveness of said subset of said data in each of said at least one field;

adjusting said hierarchy of said at least one field based on a scaled integer hash-value evaluation of said subset of said data and at least one correlation test of said subset of said data;

promoting singleton fields and subdividing levels of said hierarchy containing non-correlating data among said at least one field; and generating a normalization recommendation for said record source for review by a user of said database.

18. A method according to claim 17 wherein said step of generating includes:

generating a log-scaled distinctness count for each of said at least one field; and grouping at least two fields in a level of said hierarchy based on said log-scaled distinctness count.

19. A method according to claim 17 including:

implementing said normalization recommendation in response to a user controlled command.

20. A computer readable program storage device containing instructions for controlling a computer system to perform the method of claim 17.

* * * * *

UNITED STATES PATENT AND TRADEMARK OFFICE
CERTIFICATE OF CORRECTION

PATENT NO. :5,778,375

DATED :July 7, 1998

INVENTOR(S) :Stephen C. Hecht

It is certified that error appears in the above-identified patent and that said Letters Patent is hereby corrected as shown below:

Column 7, line 4, replace 'sample size' with --"sample size"-- .

Column 7, line 17, replace "exclusive-or ed" with --exclusive-or'ed--

Column 10, line 41, replace "Dept1D" with --DeptID--

Column 10, line 46, replace "Dept1D" with --DeptID--

Column 11, line 4, replace "flog" with --(log--

Claim 11 (original claim 12) was canceled during prosecution. Therefore, claim 11 should be deleted.

Claim 15, line 1, replace "11" with --9--

Signed and Sealed this

Sixteenth Day of March, 1999

*Attest:*

Q. TODD DICKINSON

*Attesting Officer* *Acting Commissioner of Patents and Trademarks*